Sept. 30, 1924.  L. F. DOUGLASS  1,509,936
DEVICE FOR PRODUCING DUPLICATE IMAGES ON PHOTOGRAPHIC FILMS
Filed Feb. 25, 1924

INVENTOR
Leon F. Douglass
BY
J.E. Trabucco
Attorney

Patented Sept. 30, 1924.

1,509,936

UNITED STATES PATENT OFFICE.

LEON F. DOUGLASS, OF MENLO PARK, CALIFORNIA.

DEVICE FOR PRODUCING DUPLICATE IMAGES ON PHOTOGRAPHIC FILMS.

Application filed February 25, 1924. Serial No. 694,931.

*To all whom it may concern:*

Be it known that I, LEON F. DOUGLASS, a citizen of the United States, residing at Menlo Park, in the county of San Mateo and State of California, have invented new and useful Improvements in Devices for Producing Duplicate Images on Photographic Films, of which the following is a specification.

This invention relates to prism combinations of particular construction adapted to simultaneously produce a plurality of identical images of a single object on a plurality of films.

An object of this invention is to provide a prism combination comprising two large-angle prisms so formed or shaped that some of the light rays from an object are reflected thereby onto a sensitized film and at the same time other of said rays are permitted to proceed through the prisms onto a separate sensitized film.

This invention may be used in the art of color photography, and provides a most satisfactory and convenient means for producing two images of a single object on separate films, the said images being produced in color values corresponding to color filters employed.

By means of the apparatus herein shown a plurality of images of a single object may be produced on a plurality of films with one exposure, each of said images being identical in every respect.

The form which my invention may assume is shown in the accompanying drawing in which:—

Figure 1:
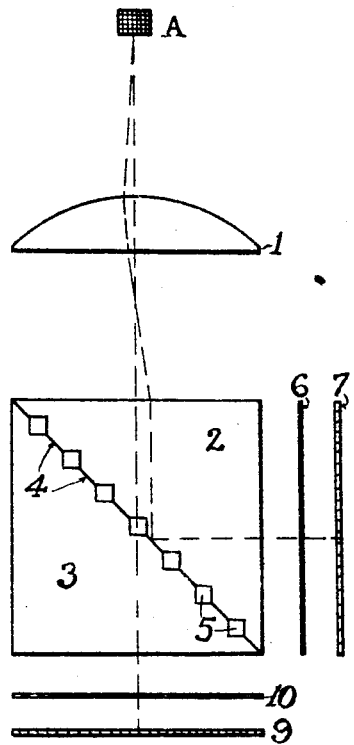
Fig. 1 is a diagrammatic view illustrating the relative position of the object to be photographed, the camera lens, the two large-angle prisms, the color filters, the films and the path of the light rays proceeding from the object to the films.
Figure 2:
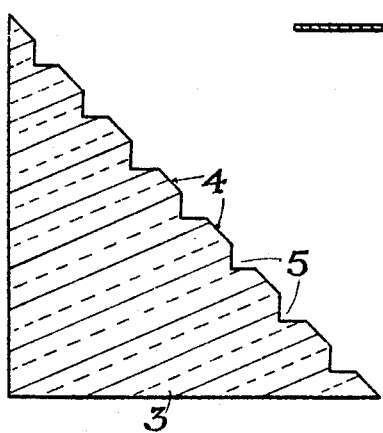
Fig. 2 is an enlarged sectional view of one of the prisms, showing the manner in which the same is constructed.

In the drawings I have shown the important features of my invention and for the sake of clearness and brevity have omitted the usual parts of the camera. The invention as shown and described herein, is embodied in a camera structure suitable to accommodate two films and a mechanism for the manipulation of the same.

Referring particularly to Fig. 1 of the drawings, object A is located in front of 1, a suitable camera lens. Immediately behind lens 1 are two large-angle prisms, 2 and 3, each having, at corresponding equal distant intervals on their large faces, a parallel triangular cut or depression 5 extending longitudinally along the said faces. The parallel triangular depressions extend longitudinally along the large faces of the prisms, and each is separated from the other by a reflecting surface 4, which is equal in width to the large side of the depression. The two large-angle prisms are placed together in such a manner that their large faces are mutually engaged, thereby causing the triangular depressions 5 of each of the prisms 2 and 3 to coincide one with the other and complete a small square which correspondingly extends longitudinally along the large surfaces of the prisms. The two prisms 2 and 3, when in the position shown in Fig. 1, form a cube having diagonally therein a plurality of squares separated one from the other by a reflecting surface equal in width to the diagonal of each square, which said squares and reflecting surfaces extend longitudinally along the large faces of the prisms.

On the right side of the prism combination and adjacent prism 2 is located sensitized film 7, in front of which is placed a color filter 6, suitable to exclude the light rays of any particular color. Behind the combination and adjacent the rear surface of prism 3 is another sensitized film 9 in front of which is located another suitable color filter 10.

The light rays proceeding from object A are refracted by lens 1 to the front surface of prism 2, after which some of them are refracted to the reflecting surfaces 4, which said surfaces reflect them through the prism 2 and color filter 6 to film 7. The other portion of the light rays proceed through prism 2, depressions 5, prism 3 and color filter 10 to film 9. Thus by one exposure, two images are produced on two separate films, each image being identical except for the difference in color values caused by the filters through which the rays pass.

I have found that the most satisfactory results may be accomplished by using two 90 degree prisms, the light rays both transmitted and reflected then proceed approximately the same distance before striking the two films, and have approximately the same intensity upon reaching the films.

While the embodiments of the invention illustrated on the drawings have been described with considerable particularity, it is to be expressly understood that the invention is not restricted thereto as the same may be carried out in a variety of ways and embodied in a variety of forms, some of which will now readily suggest themselves to those skilled in the art. I do not desire to be limited to any particular kind or form of photography in carrying out my invention, as it is apparent that the same may be used in connection with both still and motion photography or cinematography.

What I claim is:

1. A device for producing duplicate images of one object on two sensitized films, comprising two large-angle prisms located behind a camera lens with their large faces mutually engaged and provided with a plurality of parallel depressions extending parallel with each other along the said large faces of the prisms and a plurality of reflecting surfaces located between the depressions.

2. A device for transmitting a part and reflecting another part of the light projected by a camera lens, comprising a pair of large-angle prisms with their large faces mutually engaged and having along the mutually engaged faces of the prisms a plurality of parallel depressions through which light rays may be transmitted and a plurality of reflecting surfaces lying between the depressions for reflecting another part of the light rays.

3. A device for producing a plurality of images of an object on a plurality of films, comprising a pair of large-angle prisms positioned behind a camera lens with their large faces mutually engaged and provided along their large faces with a plurality of parallel light-transmitting depressions and a plurality of parallel reflecting surfaces, the said depressions each being separated by one of said reflecting surfaces.

4. A light-transmitting and a reflecting device for the purpose described, comprising a pair of large-angle prisms positioned behind a camera lens with their large faces mutually engaged and provided along the large faces with a series of parallel light-reflecting surfaces and a series of parallel light-transmitting depressions.

LEON F. DOUGLASS.